United States Patent Office 2,969,375
Patented Jan. 24, 1961

2,969,375
PYRROLIDONE PURIFICATION

William O. Ney, Jr., Lincoln Township, Washington County, Minn., assignor to Minnesota Mining and Manufacturing Company, St. Paul, Minn., a corporation of Delaware No Drawing. Filed Jan. 27, 1958, Ser. No. 711,177

3 Claims. (Cl. 260—326.5)

This invention relates to an improved process for the purification of pyrrolidone.

It is known that the polymerization of 2-pyrrolidone is sensitive to the presence of traces of impurities, which among other things, affect the reproducibility of polymer from sample to sample. Procedures for the purification of pyrrolidone have been described involving, for example, reaction with carboxylic acid anhydrides in U.S. Patent 2,806,850 or crystallization of the hydrate followed by dehydration as in U.S. Patent 2,802,777. While these effect a degree of purification which approaches the maximum possible, it has been found that there still remain in the monomer thus treated traces of material of unknown structure. These impurities, though small in amount, appear to be detrimental to reproducibility of polymerization conditions, and are also probably associated with discoloration of polypyrrolidone. They appear to consist at least in part of unsaturated substances.

It is an object of this invention to provide a process for removing unsaturated materials from pyrrolidone. It is another object of the invention to provide a process for purifying pyrrolidone. Other objects will become apparent hereinafter.

As is known, pyrrolidone is a very high boiling substance which melts at about room temperature. It is usually considered to be very difficult to purify materials having melting points below about 35° to 40° C. or even somewhat higher, by recrystallization, and reliance is therefore placed on distillation of such substances to achieve purification. This situation has been true of pyrrolidone, although such solvents as diethyl ether and methylene chloride can be used with some success if very carefully purified grades of these materials are employed. It is therefore quite surprising to find in accordance with the objects of this invention that pyrrolidone can be very readily purified by recrystallization from certain aromatic solvents. Because of the low melting point of pyrrolidone it would rather be expected that many of the impurities might be occluded by it and not be eliminated, particularly when using concentrated solutions; therefore it is also noteworthy that this process results in the elimination of the last traces of substantially all impurities, particularly the unsaturated impurities. The only impurity present in pyrrolidone which is not removed to a very considerable extent by the process of the invention is water. However, the removal of water from the pyrrolidone is conveniently effected by known means at any of several points in the purification of monomer or polymerization thereof.

Broadly speaking, alkyl benzenes which are liquid at a temperature in the range of about —20° C. to about —35° C. are useful as crystallization solvents in the process of the invention.

Although toluene seems to be best suited for the process of the invention, ortho- and meta-xylene are also useful as well as mixed xylenes which are low in concentration of para-xylene. These liquid aromatic hydrocarbons possess a peculiarly fortunate combination of properties which make them of exceptional value. They are non-toxic, not excessively high boiling and readily available in a state free of impurities such as sulfur compounds.

The crystallization is performed in the normal manner, by dissolving the pyrrolidone in the toluene and then cooling. Generally, cooling to a temperature below about 0° C. is necessary, and for best recovery cooling to a temperature in the range of about —20° C. to —35° C. is indicated.

The manner of carrying out the process of this invention is open to a number of variations which will be apparent to those skilled in the art. For example, filtration can be effected by any of several techniques including centrifugation; cooling can be by means of any desired refrigerant, the proportion of solvent may be varied over wide ranges and so forth.

The following examples, in which all parts are by weight unless otherwise specified, illustrate the best contemplated methods of carrying out the invention and do not limit the scope of the invention.

Example 1

A vessel equipped for cooling to at least —20° C. is charged with 100 parts each of crude commercial pyrrolidone and toluene. With a moderate amount of agitation and slight warming if necessary, a solution of pyrrolidone in the toluene is formed. Any insoluble material is removed by filtration, and the clear yellowish solution is then cooled gradually to about —20° C. crystalline pyrrolidone is filtered on a cold filter, avoidstantially complete at —20° C. The cold magma of crystalline pyrrolidone is filtered on a cold filte, avoiding so far as possible contact with moist air because condensed water is readily taken up by the pyrrolidone. The collected crystalline material is freed as far as possible from the rather yellow mother liquor. A filter press equipped for blow-down with cold dry nitrogen is conveniently employed for this purpose; alternatively, centrifugation is also very convenient. The filter cake is returned to the cleaned vessel and again crystallized from 100 parts of toluene by the same procedure and collected. This process is repeated twice more (four crystallizations in all). The crystalline product is freed from toluene by warming under vacuum.

The mother liquors obtained from the second and subsequent crystallizations can be reused for crystallizations of other batches if desired, as, for example, the second mother liquor for the first crystallization of the subsequent batch, the third mother liquor for the second crystallization of the subsequent batch, the fourth for the third and fresh toluene for the fourth and last crystallization of the second batch. In this way the consumption of toluene is reduced and the recovery of purified pyrrolidone is enhanced. Toluene is further recovered by distillation, the residues being subjected to recovery for further purification if desired.

After removal of toluene, the residue from the mother liquors of the first crystallization is compared with the final product of the process as obtained from the fourth crystallization for the content of unsaturated material, as a measure of the purity of the respective materials. The former is a strongly yellow crude pyrrolidone, while the latter is almost water white. One-quarter gram samples of the first residue and of the product are dissolved in about 5 ml. each of carbon tetrachloride and the solutions are titrated with a solution of 2 g. of bromine in 30 ml. of carbon tetrachloride. The final product requires only one drop to give a permanent yellow color but the first residue requires about 10 to 20 drops showing a much higher concentration of unsaturated impurities. The commercial pyrrolidone processed requires about 4 drops, pyrrolidone purified by the process of U.S. Patent 2,806,856 using propionic anhydride requires about 3 drops and that purified by the process of U.S. Patent 2,802,777 requires about 3 drops in a comparable titration.

These materials are compared for presence of basic impurities by measurement of the pH values of 1 percent solutions in distilled water. The results are:

|  | pH |
|---|---|
| Commercial pyrrolidone | 8–11 |
| Purified by process of U.S. 2,806,856, using propionic anhydride | 7–9 |
| Purified by process of U.S. 2,802,777 | 9–11 |
| First residue | 9–11 |
| Product pyrrolidone | 6.5–6.7 |

After removal of toluene, the product pyrrolidone needs only the removal of water to be readily polymerizable as shown in the following example.

Example 2

A vessel equipped for vacuum distillation is charged with 100 parts of the toluene-free product pyrrolidone of Example 1 and 10 parts of reagent quality mixed xylenes (boiling point 137–140° C.). Xylene and water are azeotropically distilled from the mixture under a pressure of about 18 mm. of mercury at pot temperature about 45° C. When the contents of the vessel reaches 90° C. at this pressure, the residual pyrrolidone contains less than 0.1 percent water. Distillation is discontinued and the anhydrous pyrrolidone in the flask is cooled under dry nitrogen to about 25° C. and is ready for polymerization.

Potassium pyrrolidone is prepared by addition during 3 hours of 70 parts of pyrrolidone (previously dried by distillation as above) to an agitated suspension of 30 parts of potassium in 250 parts of toluene under an atmosphere of nitrogen at 60° to 70° C. As the reaction proceeds the blue grey suspension of potassium is slowly changed to a pure white suspension of potassium pyrrolidone. After completion of the addition of pyrrolidone, the mixture is heated at 60° to 70° C. for about 1 hour to insure completion of the reaction. Toluene is then sucked out of the reaction vessel by means of a filter stick and the potassium pyrrolidone is reslurried three times with anhydrous heptane which is removed each time by means of the filter stick. An atmosphere of nitrogen is maintained over the potassium pyrrolidone at all times. After the last slurrying, as much of the heptane as possible is sucked out and the potassium pyrrolidone is dried for 12 hours at about 5 mm. Hg and 125° C.

Polymerization of the anhydrous pyrrolidone is then initiated by admixing therewith 5.6 parts of potassium pyrrolidone and, after solution, 0.75 part of acetylpyrrolidone. An exothermic reaction begins at once and in five minutes the mixture has set to a firm mass. Polymerization proceeds under anhydrous conditions and is substantially complete after 48 hours. Polypyrrolidone is isolated and purified by breaking up the polymerized reaction mass and comminuting thoroughly in distilled water in a Waring Blendor. The white powdery polypyrrolidone is collected and washed twice with about 200 parts of water and then with 200 parts of methanol and is dried in vacuo at 70° C. for 5 hours. It has an inherent viscosity (0.2 g. in 100 cc. metracresol) of 2.8 and melts at about 260° C. It shows all of the characteristics of polypyrrolidone as respects fabrication.

Example 3

The process of recrystallization of Example 1 is repeated, except that instead of using toluene, the same quantity of the mixed xylenes boiling at about 137° to 140° C. and comprising mostly ortho-xylene are employed. In this instance the product pyrrolidone is charged to a tared distillation vessel together with 5 parts of xylene. Water and xylene are removed by distillation under reduced pressure as in Example 2 and the residual pyrrolidone (75 parts) is polymerized as in Example 2 using proportional amounts of potassium and acetylpyrrolidone. The polypyrrolidone is processed as above and is obtained in over 70 percent yield, having the excellent characteristics of the polymer of Example 2.

Other variations which can be employed in carrying out the process of the present invention will be readily apparent. For example, if moisture is carefully excluded thereafter, the drying step consisting of azeotropic distillation with xylene as shown in Example 3 can precede the crystallization.

In general it is found most effective to carry out crystallizations according to this invention using a weight of solvent approximately equal to the weight of pyrrolidone being purified, although it is also possible to use lower or higher proportions. In general when lower proportions are used, very effective separation of the mother liquors or washing of the filter cake with small portions of cold solvent is desirable; when higher proportions are used the crystallization temperature is desirably lower, for example, −35° C. The need for multiple crystallizations is determined by the quality of the crude pyrrolidone employed and the skill with which the operations are carried out. Thus, in some instances one crystallization may suffice, whereas samples may require two or more crystallizations to achieve the requisite state of purity. It is to be observed that the examples and disclosure hereinabove are provided solely as illustrative of this invention which is only limited by the following claims.

What is claimed is:

1. The process for the production of purified 2-pyrrolidone which is especially adapted for polymerization, from crude commercial 2-pyrrolidone, which consists in the steps of separating water from the pyrrolidone, and dissolving the pyrrolidone in an alkyl benzene solvent which is liquid at a temperature in the range of about −20° C. to −35° C., cooling the solvent to bring about crystallization of pyrrolidone therefrom, and recovering the crystallized pyrrolidone.

2. The process of claim 1, wherein the solvent is toluene.

3. The process of claim 1, wherein the solvent is xylene.

References Cited in the file of this patent

UNITED STATES PATENTS

| 2,221,369 | Cass | Nov. 2, 1940 |
| 2,313,026 | Schlack | Mar. 2, 1943 |
| 2,667,483 | Feegers | Jan. 2, 1954 |
| 2,758,991 | Kretzers et al. | Aug. 1, 1956 |
| 2,828,307 | Soeterbroek et al. | Mar. 25, 1958 |

FOREIGN PATENTS

| 666,717 | Great Britain | Feb. 20, 1952 |

OTHER REFERENCES

Merck Index, 6th Ed., pp. 124 and 733 (1952).

UNITED STATES PATENT OFFICE
CERTIFICATION OF CORRECTION

Patent No. 2,969,375            January 24, 1961

William O. Ney, Jr.

It is hereby certified that error appears in the above numbered patent requiring correction and that the said Letters Patent should read as corrected below.

Column 2, line 32, for "crystalline pyrrolidone is filtered on a cold filter, avoid-" read -- Crystallization commences at about -5° C. and is sub- --; line 34, for "filte" read -- filter --; column 3, line 68, for "metracresol" read -- metacresol --.

Signed and sealed this 13th day of June 1961.

(SEAL)
Attest:

ERNEST W. SWIDER            DAVID L. LADD
Attesting Officer            Commissioner of Patents